(12) United States Patent
Okamoto et al.

(10) Patent No.: US 8,389,854 B2
(45) Date of Patent: Mar. 5, 2013

(54) METAL STRIP, CONNECTOR, AND METHOD OF MANUFACTURING METAL STRIP

(75) Inventors: Masahide Okamoto, Yokohama (JP); Osamu Ikeda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 441 days.

(21) Appl. No.: 12/602,385

(22) PCT Filed: Oct. 14, 2008

(86) PCT No.: PCT/JP2008/002900
§ 371 (c)(1),
(2), (4) Date: Nov. 30, 2009

(87) PCT Pub. No.: WO2009/050878
PCT Pub. Date: Apr. 23, 2009

(65) Prior Publication Data
US 2010/0175908 A1    Jul. 15, 2010

(30) Foreign Application Priority Data
Oct. 19, 2007   (JP) ................................ 2007-271947

(51) Int. Cl.
*H01B 7/00*    (2006.01)
(52) U.S. Cl. ............................................. 174/36
(58) Field of Classification Search .............. 174/36, 174/250–252; 428/647, 646, 648, 929, 935, 428/615
See application file for complete search history.

(56) References Cited

U.S. PATENT DOCUMENTS

| | | | | |
|---|---|---|---|---|
| 5,780,172 A * | 7/1998 | Fister et al. | ................... | 428/647 |
| 5,916,695 A * | 6/1999 | Fister et al. | ................... | 428/647 |
| 6,083,633 A * | 7/2000 | Fister et al. | ................... | 428/615 |
| 6,451,449 B2 * | 9/2002 | Asakura et al. | ............... | 428/615 |
| 2002/0185716 A1 * | 12/2002 | Abys et al. | ................... | 257/677 |
| 2003/0113577 A1 * | 6/2003 | Zheng | ........................... | 428/673 |
| 2003/0129441 A1 | 7/2003 | Hara et al. | | |
| 2009/0126972 A1 * | 5/2009 | Matsushita et al. | ....... | 174/113 R |

FOREIGN PATENT DOCUMENTS

| | | |
|---|---|---|
| JP | 8-176775 A | 7/1996 |
| JP | 11-350188 A | 12/1999 |
| JP | 2002-164106 A | 6/2002 |
| JP | 2003-293187 A | 10/2003 |
| JP | 2003-293187 A * | 10/2003 |
| JP | 2004-068026 | 3/2004 |
| JP | 2005-56605 A | 3/2005 |
| JP | 2006-49083 A | 2/2006 |
| JP | 2006-196323 A | 7/2006 |
| WO | WO 2008/075723 A1 | 6/2008 |

OTHER PUBLICATIONS

International Search Report dated Jan. 27, 2009 with translation (four (4) pages).

* cited by examiner

*Primary Examiner* — William Mayo, III
(74) *Attorney, Agent, or Firm* — Crowell & Moring LLP

(57) ABSTRACT

A Ni plating is applied on a base metal in a metal strip form, and a brightener-free Sn-(1 to 4% by mass)Cu plating is applied on the Ni plating. The metal strip is heat-treated at a temperature at or above the melting point (solidus line) of a Sn-(1 to 4% by mass)Cu alloy to form a Cu-Sn compound layer or a Cu—Ni—Sn-compound layer on the Ni plating layer and a Sn layer or a Sn—Cu-ally layer on the Cu—Sn compound layer or the Cu—Ni—Sn-compound layer. The metal strip is further fabricated into a connector.

13 Claims, 4 Drawing Sheets

FIG. 4

| | SURFACE LAMINATED STRUCTURE (UNDERLAYER→SURFACE LAYER) | SN-CU LAYER LIQUIDUS TEMPERATURE (°C) | HEAT-TREATMENT TEMPERATURE (°C) | AFTER HEAT TREATMENT ||||| WHISKER OCCURRENCE ||
|---|---|---|---|---|---|---|---|---|---|
| | | | | COMPOUND LAYER || ALLOY LAYER | VICKERS HARDNESS | INTERNAL STRESS INDUCED | EXTERNAL STRESS INDUCED |
| | | | | THICKNESS (μm) | COMPOSITION | COMPOSITION | | | |
| EXAMPLE 1 | Ni:0.7μm/MATTE Sn-1.0Cu:4μm | 235 | 260 | 0.9 | Cu-Ni-Sn | Sn-0.75Cu | 23 | NIL | LENGTH < 20μm |
| EXAMPLE 2 | Ni:0.7μm/MATTE Sn-1.2Cu:4μm | 240 | 280 | 1.0 | Cu-Ni-Sn | Sn-0.75Cu | 26 | NIL | LENGTH < 20μm |
| EXAMPLE 3 | Ni:0.7μm/MATTE Sn-2.6Cu:4μm | 305 | 320 | 0.8 | Cu-Ni-Sn | Sn-0.75Cu | 50 | NIL | LENGTH < 20μm |
| EXAMPLE 4 | Ni:0.7μm/MATTE Sn-3.8Cu:4μm | 340 | 350 | 0.8 | Cu-Ni-Sn | Sn-0.75Cu | 80 | NIL | LENGTH < 20μm |
| EXAMPLE 5 | Ni:0.7μm/MATTE Sn-4.0Cu:4μm | 350 | 350 | 0.5 | Cu-Ni-Sn | Sn-0.75Cu | 100 | NIL | LENGTH < 20μm |
| EXAMPLE 6 | Ni:0.7μm/MATTE Sn-1.2Cu:4μm | 240 | 230 | 0.2 | Cu-Sn | Sn-0.75Cu | 25 | NIL | LENGTH < 20μm |
| EXAMPLE 7 | Ni:0.7μm/MATTE Sn-2.6Cu:4μm | 305 | 260 | 0.1 | Cu-Sn | Sn-0.75Cu | 50 | NIL | LENGTH < 20μm |
| EXAMPLE 8 | Ni:0.7μm/MATTE Sn-3.8Cu:4μm | 340 | 300 | 0.1 | Cu-Sn | Sn-0.75Cu | 80 | NIL | LENGTH < 20μm |
| EXAMPLE 9 | Ni:0.7μm/MATTE Sn-1.2Cu:4μm | 240 | 230 | 1.2 | Cu-Ni-Sn | Sn | 20 | NIL | LENGTH < 20μm |
| COMPARATIVE EXAMPLE 1 | Ni:0.7μm/MATTE Sn-3.8Cu:4μm | 340 | 380 | 1.6 | Cu-Ni-Sn | Sn-0.75Cu | 170 | NIL | LENGTH < 50μm |
| COMPARATIVE EXAMPLE 2 | Ni:0.7μm/MATTE Sn-5.1Cu:5μm | 370 | 400 | 2.0 | Cu-Ni-Sn | Sn-0.75Cu | 380 | NIL | LENGTH < 50μm |
| COMPARATIVE EXAMPLE 3 | Ni:0.7μm/MATTE Sn-19.3Cu:6μm | 530 | 560 | 2.0 | Cu-Ni-Sn | Sn-0.75Cu | 240 | NIL | LENGTH < 50μm |
| COMPARATIVE EXAMPLE 4 | Ni:0.7μm/GLOSS Sn-1.7Cu:4μm | 270 | 300 | 1.0 | Cu-Ni-Sn | Sn-0.75Cu | 165 | NIL | LENGTH < 50μm |

FIG. 5

| | SURFACE LAMINATED STRUCTURE (UNDERLAYER→SURFACE LAYER) | SN-CU LAYER LIQUIDUS TEMPERATURE (°C) | HEAT-TREATMENT TEMPERATURE (°C) | AFTER HEAT TREATMENT | | |
|---|---|---|---|---|---|---|
| | | | | WETTING BALANCE TEST | | SOLDER WETTABILITY |
| | | | | ZERO CROSS TIME | MAXIMUM WETTING FORCE | |
| EXAMPLE 1 | Ni:0.7μm/MATTE Sn-10Cu:4μm | 235 | 260 | 3.6 | 0.8 | OK |
| EXAMPLE 2 | Ni:0.7μm/MATTE Sn-12Cu:4μm | 240 | 280 | 3.3 | 0.9 | OK |
| EXAMPLE 3 | Ni:0.7μm/MATTE Sn-26Cu:4μm | 305 | 320 | 3.5 | 0.8 | OK |
| EXAMPLE 4 | Ni:0.7μm/MATTE Sn-38Cu:4μm | 340 | 350 | 3.2 | 1.2 | OK |
| EXAMPLE 5 | Ni:0.7μm/MATTE Sn-40Cu:4μm | 350 | 350 | 3.9 | 0.7 | OK |
| EXAMPLE 6 | Ni:0.7μm/MATTE Sn-12Cu:4μm | 240 | 230 | 1.2 | 2.7 | OK |
| EXAMPLE 7 | Ni:0.7μm/MATTE Sn-26Cu:4μm | 305 | 260 | 1.5 | 1.2 | OK |
| EXAMPLE 8 | Ni:0.7μm/MATTE Sn-38Cu:4μm | 340 | 300 | 2.9 | 0.8 | OK |
| EXAMPLE 9 | Ni:0.7μm/MATTE Sn-12Cu:15μm | 240 | 230 | 1.2 | 2.6 | OK |
| COMPARATIVE EXAMPLE 1 | Ni:0.7μm/MATTE Sn-38Cu:4μm | 340 | 380 | >20 | -0.6 | NG |
| COMPARATIVE EXAMPLE 2 | Ni:0.7μm/MATTE Sn-51Cu:5μm | 370 | 400 | >20 | -1.3 | NG |
| COMPARATIVE EXAMPLE 3 | Ni:0.7μm/MATTE Sn-19.3Cu:6μm | 530 | 560 | >20 | -1.7 | NG |
| COMPARATIVE EXAMPLE 4 | Ni:0.7μm/GLOSS Sn-1.7Cu:4μm | 270 | 300 | >20 | -0.4 | NG |

METAL STRIP, CONNECTOR, AND METHOD OF MANUFACTURING METAL STRIP

CLAIM OF PRIORITY

The present application claims priority from Japanese Patent Application JP 2007-271947 filed on Oct. 19, 2007, the content of which is hereby incorporated by reference into this application.

BACKGROUND OF THE INVENTION

The present invention relates to: a terminal constituting an electric connector, in particular a connector terminal fitted for electrical connection to another member such as an FPC (Flexible Print Card), an FFC (Flexible Flat Cable) and the like; a metal strip constituting the terminal; and a method of manufacturing the metal strip. In particular, the present invention relates to a lead-free plated connector terminal of a narrow pitch to which lead-free plating is applied and a metal strip constituting the terminal.

BACKGROUND ART

A terminal constituting a connector is soldered when it is attached to a substrate and hence plating is applied to the whole surface of a metal strip constituting the terminal in general. As lead-free plating treatment with a low environmental burden, treatment for forming a Sn solder layer on a Ni underlayer, a low-cost Sn plated material formed by applying Sn plating to Cu or Cu alloy and the like are known from the viewpoint of solderability, contact reliability, and corrosion resistance. In the case of a narrow pitch connector having a pitch of 0.5 mm or less, it is also necessary to inhibit the growth of whiskers that may undesirably cause short circuit by the contact with an adjacent connector terminal.

A method of securing solderability and corrosion resistance by applying Ni plating on a base metal and applying Sn—Cu plating onto the Ni Plating is proposed in Patent Document 1. A method of preventing whiskers from forming from a contact site at the time of connection by applying primary plating of Ni or Cu on a base metal and applying Sn—Bi plating onto the primary plating is proposed in Patent Document 2. Further, a method of securing both whisker prevention and solder wettability by applying a plating layer having a Ni layer, a Ni—Sn intermetallic compound layer, a mixed layer including a Ni—Sn intermetallic compound and Sn, and a tin oxide layer sequentially on a base metal is proposed in Patent Document 3. In addition, a method of providing good solderability, good whisker resistance, good heatproof reliability, and good forming processability by: applying Ni or Ni alloy plating, Cu plating, and Sn or Sn alloy plating onto the surface of Cu or Cu alloy; and applying heat treatment at 400° C. to 900° C., forming a Ni or Ni alloy layer, a layer containing Cu and Sn or Cu, Sn, and Ni as the main components, and a Sn or Sn alloy layer sequentially from the side of the Cu or Cu alloy is proposed in Patent Document 4.

Patent Document 1: JP-A No. 164106/2002
Patent Document 2: JP-A No. 56605/2005
Patent Document 3: JP-A No. 49083/2006
Patent Document 4: JP-A No. 293187/2003

In the case of a metal strip provided by simply applying Sn—Cu plating onto Ni primary plating as proposed in Patent Document 1, however, solder wettability and corrosion resistance are secured but whiskers are hardly inhibited from growing. With applying only double layer plating, a Cu—Sn compound is not formed at the interface between the Ni primary plating and the Sn—Cu plating, Ni diffuses selectively to Sn grain boundaries in the Sn—Cu plating during long time storage, thereby a Ni—Sn compound grows along the Sn grain boundaries, resultantly volume changes locally, thus internal compression pressure is caused, the internal compression pressure destroys a tin oxide film on the outermost surface, and whiskers are formed and grow undesirably.

Further, it is difficult to inhibit whiskers from forming only by applying Sn—Bi plating on Ni or Cu primary plating on a metal strip as proposed in Patent Document 2. Ni or Cu reacts with Sn in the Sn—Bi plating during reflow, a Ni—Sn compound or a Cu—Sn compound is formed at the interface and, since a barrier layer against reaction does not exist, the reaction layer is formed in quantity. As a result, large internal compression stress is generated in the interior of the plating and moreover whiskers appear although the frequency of the appearance is lower than that of Ni primary plating/Sn—Cu plating.

Furthermore, in the method of forming a plating layer having a Ni layer, a Ni—Sn intermetallic compound layer, a mixed layer including a Ni—Sn intermetallic compound and Sn, and a tin oxide layer sequentially as proposed in Patent Document 3, the Ni—Sn compound has already grown to the extent of reaching the tin oxide layer on the surface, large internal compression stress is generated in the interior of the plating because the Ni—Sn compound is formed in quantity, and whiskers appear undesirably even when the support column effect of the Ni—Sn compound is exhibited. Further, because some of the Ni—Sn compound reaches the tin oxide layer on the surface, the solder wettability is also inferior to that of a case otherwise.

Further in the case of Patent Document 4, since the Cu—Sn compound layer is formed on the Ni layer by applying heat treatment, Ni does not touch the Sn—Cu plated layer, hence the Ni—Sn compound is inhibited from growing, and consequently the growth of whiskers caused by internal compression stress can be inhibited. However, since only the whiskers caused by the internal compression stress in the plated film is taken into consideration as a measure for inhibiting whiskers, then the plated film comes to be very hard due to the heat treatment at a high temperature of 400° C. to 900° C., and it is impossible to inhibit the whiskers caused by external compression stress that is generated on the occasion of connector fitting.

The present invention solves the above problems and provides: a connector terminal that inhibits not only the growth of whiskers caused by internal compression stress in a plated film (inhibits the growth of an intermetallic compound layer in the plated film) but also the growth of whiskers caused by external compression stress generated in connector fitting and secures solder wettability; and a metal strip constituting the connector terminal.

Here, the aforementioned metal strip is mostly used for a connector. When terminals of substrates are flexibly connected to each other, an FPC or an FFC is generally used. In this case, it is necessary to solder connectors to the terminals of both the substrates and connect both the connectors to each other through the FPC or the FFC. A metal strip according to the present invention can be used particularly for a connector having a narrow terminal pitch of 0.5 mm or less and being lead-free among such connectors.

SUMMARY OF THE INVENTION

Representative outlines of the present invention disclosed in this application are briefly explained as follows.

(1) A metal strip: comprising a base metal, a Ni layer formed on the base metal, a Cu—Sn compound layer or a Cu—Ni—Sn compound layer formed on the Ni layer, and a Sn layer or a Sn—Cu alloy layer formed on the Cu—Sn compound layer or the Cu—Ni—Sn compound layer; and having a Vickers hardness of 100 or less.

(2) The metal strip according to the above item (1), wherein the proportion of a total Cu quantity to a total Sn+Cu quantity in the Sn layer or the Sn—Cu alloy layer and the Cu—Sn compound layer or the Cu—Ni—Sn compound layer is 1 to 4 mass %.

(3) A method of manufacturing a metal strip, the method including the steps of: laminating a Ni layer and a Sn-(1 to 4 mass %)Cu alloy layer sequentially on a base metal; and heat-treating the laminated base metal at a temperature not lower than the solidus temperature of the Sn-(1 to 4 mass %)Cu alloy and forming a Cu—Sn compound layer or a Cu—Ni—Sn compound layer on the Ni layer, and a Sn layer or a Sn—Cu alloy layer on the Cu—Sn compound layer or the Cu—Ni—Sn compound layer.

(4) The method of manufacturing a metal strip according to the above item (3), wherein the Sn-(1 to 4 mass %)Cu alloy layer is formed by matt plating.

The present invention makes it possible to provide: a metal strip that inhibits not only the growth of whiskers caused by internal compression stress in a plated film (inhibits the growth of an intermetallic compound layer in the plated film) but also the growth of whiskers caused by external compression stress generated in connector fitting and secures solder wettability; and a connector including the metal strip.

BRIEF DESCRIPTION OF THE DRAWING

[FIG. 4] A table showing the occurrence of whiskers in metal strips according to the present invention and conventional metal strips.

[FIG. 5] A table showing the solder wettability of metal strips according to the present invention and conventional metal strips.

DESCRIPTION OF THE PREFERRED EMBODIMENTS

Figure 1:
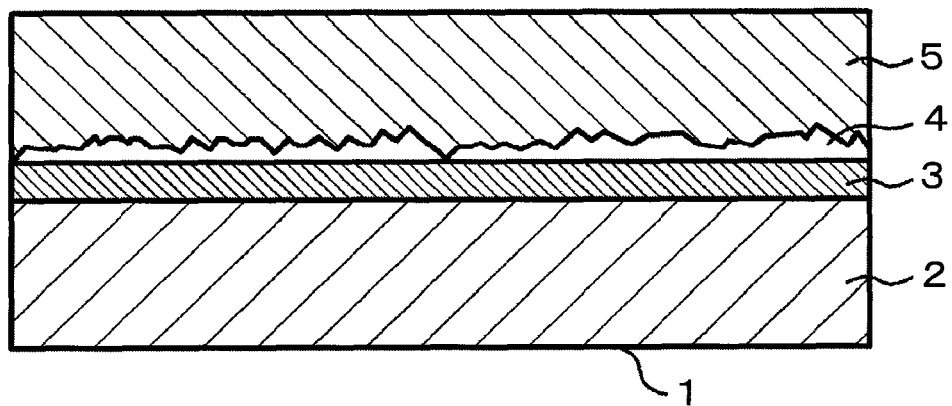
[FIG. 1] A schematic sectional view showing the layered structure of a metal strip according to the present invention.

Firstly, a first embodiment of a metal strip according to the present invention is explained in reference to FIG. 1.

FIG. 1 is a view showing a cross section of the layered structure of a metal strip 1 according to the present invention and, on a base metal 2, a laminated structure including a Ni layer 3, a Cu—Sn compound layer or a Cu—Ni—Sn compound layer 4 formed on the Ni layer 3, and a Sn layer or a Sn—Cu alloy layer 5 formed on the Cu—Sn compound layer or the Cu—Ni—Sn compound layer 4 and not containing a brightener is formed. Then the Vickers hardness of the metal strip 1 is 100 or less.

An important point of the present structure is that a reaction preventive double barrier layer is formed between the base metal 2 and the Sn layer or the Sn—Cu alloy layer 5 not containing a brightener. That is, by so doing, reaction between the Ni layer 3 and the Sn layer or the Sn—Cu alloy layer 5 not containing a brightener can be inhibited by the Cu—Sn compound layer or the Cu—Ni—Sn compound layer 4, and reaction between the base metal 2 and the Cu—Sn compound layer or the Cu—Ni—Sn compound layer 4 and between the base metal 2 and the Sn layer or the Sn—Cu alloy layer 5 not containing a brightener can be inhibited by the Ni layer 3. Consequently, it is possible to prevent the Ni—Sn compound, the Cu—Sn compound, and the Cu—Ni—Sn compound from growing in the plated film, and inhibit Sn whiskers caused by internal compression stress from forming from the surface of the metal strip. A Cu alloy such as phosphor bronze is generally used as the base metal 2 in many cases and compound forming accelerated by the supply of Cu from the Cu alloy may possibly cause whiskers. As stated above, however, the supply of Cu from phosphor bronze is blocked by the Ni layer 3, the reaction between the base metal and the Cu—Sn compound layer or the Cu—Ni—Sn compound layer 4 is inhibited, and hence by the metal strip having a layered structure according to the present invention, ordinary phosphor bronze can be used as the base metal without using a special material.

Further in the present structure, since the Vickers hardness is controlled to 100 or less, even when the metal strip fits with an FPC or an FFC and pressure is loaded from outside, compression stress is scarcely generated at the joint and whiskers caused by external compression stress can be inhibited from growing.

Here, a preferable thickness of a Ni layer 3 in the present structure is in the range of 0.05 to 1.0 μm. The reason is that, if the thickness of the Ni layer 3 is less than 0.05 μm, the reaction preventive function between the base metal 2 and the Cu—Sn compound layer or the Cu—Ni—Sn compound layer 4 and between the base metal 2 and the Sn layer or the Sn—Cu alloy layer 5 not containing a brightener does not work well and in contrast, if it exceeds 1.0 μm, the forming processability of the metal strip deteriorates.

Further, the formed Cu—Sn compound is mostly $Cu_6Sn_5$ and the formed Cu—Ni—Sn compound is mostly $(Cu, Ni)_6Sn_5$, and in addition $Cu_3Sn$ and $(Cu, Ni)_3Sn$ may partially form in some cases. The proportion of Cu in the Sn—Cu alloy layer 5 is usually 0.7 to 0.9 mass % that is the Sn—Cu eutectic composition.

Furthermore, a preferable total thickness of the surface layer (the Ni layer 3, the Cu—Sn compound layer or the Cu—Ni—Sn compound layer 4, and the Sn layer or the Sn—Cu alloy layer 5 not containing a brightener) is in the range of 1 to 10 μm. The reason is that, if the total thickness is less than 1 μm, solder wettability deteriorates and in contrast, if it exceeds 10 μm, the forming processability of the metal strip deteriorates.

Here, although the present structure has been described on the basis of a metal strip including a Ni layer as the first layer, a Cu—Sn compound layer or a Cu—Ni—Sn compound layer as the second layer, and a Sn layer or a Sn—Cu alloy layer not containing a brightener as the third layer and having a Vickers hardness of 100 or less, the present invention is not limited to the metal strip, and various modifications in the range not deviating from the tenor of the present invention are also included in the present invention as long as the metal strip is the combination of materials that can form a reaction preventive double barrier layer and can take a structure to prevent the progress of forming a compound and has a Vickers hardness of 100 or less. For example, it is also possible to use a Zn—Sn compound layer as the second layer and a layer having a eutectic composition of Sn and Zn and having a Vickers hardness of 100 or less as the third layer. Further, the first layer may be a Co layer, a Fe layer and the like.

Successively, a method of manufacturing a metal strip according to the present invention is explained.

Figure 2:
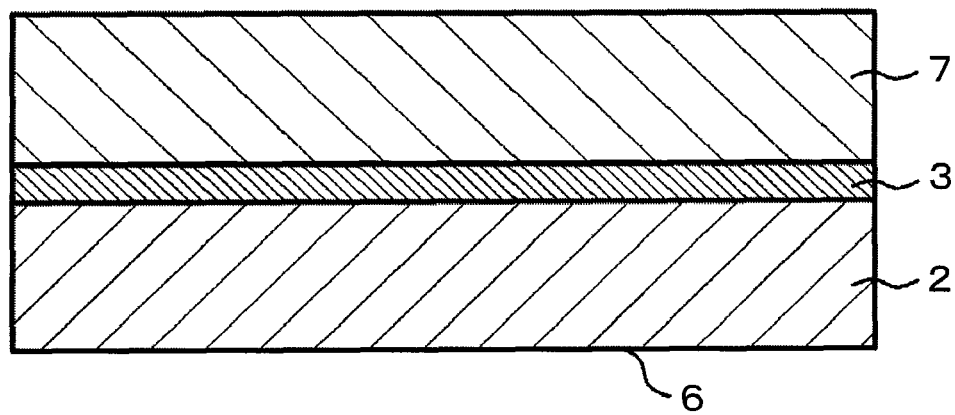
[FIG. 2] A schematic sectional view showing a first layered structure of a metal strip before heat treatment used for manufacturing a metal strip according to the present invention.

FIG. 2 is a sectional view showing the first laminated structure of a metal strip 6 before heat treatment used for manufacturing a metal strip according to the present invention, and a Ni layer 3 is formed on a base metal 2 and a matte Sn—Cu alloy layer 7 is formed on the Ni layer 3 sequentially by plating and the like. Here, the matte Sn—Cu alloy layer 7 formed on the Ni layer 3 is necessary for forming a Cu—Sn compound layer or a Cu—Ni—Sn compound layer 4 immediately on the Ni layer 3 by heat treatment that is described later.

Here, a preferable thickness of the matte Sn—Cu alloy layer 7 is in the range of 1 to 5 μm. The reason is that, if the thickness is less than 1 μm, solder wettability lowers and, if it exceeds 5 atm, the forming processability of the metal strip deteriorates. Further, the Sn—Cu alloy layer 7 may contain one or more kinds of metals selected from the group of Zn, Al, Si, Mg, and Ti by 1 mass % or less. By containing a trace of such easily-oxidizable metals, the metals are selectively oxidized during the subsequent heat treatment and reflow process, hence the oxidation of the Sn—Cu alloy layer on the outermost surface can be inhibited to the minimum, and the generation of plated film internal compression stress caused by the lid effect of the tin oxide layer on the outermost surface and the accompanying occurrence of whiskers can be inhibited. Here in order to exhibit such effects, it is necessary for the Sn—Cu alloy layer 7 to contain one or more kinds of metals selected from the group of Zn, Al, Si, Mg, and Ti by 0.01 mass % or more.

After the above layer forming processes, the matte Sn—Cu alloy layer 7 melts partially by applying heat treatment to the metal strip 6 at a temperature not lower than the solidus line of the matte Sn—Cu alloy layer 7. By so doing, some of the Cu—Sn compound that has existed in the form of floating islands in the matte Sn—Cu alloy layer 7 melts and reprecipitates immediately on the Ni layer 3, and the Cu—Sn compound layer is formed. Further, when the temperature is raised to a temperature not lower than the liquidus line, the matte Sn—Cu alloy layer 7 melts completely. Thereafter, the Cu—Sn compound precipitates again when the metal strip is cooled and, on this occasion, Ni acts as the nuclei for the reprecipitation and the Cu—Sn compound precipitates on the Ni layer 3. Here, when the heat treatment temperature is lower than the liquidus temperature, the process may end up only with the reprecipitation of the Cu—Sn compound in some cases but, when the heat treatment temperature is not lower than the liquidus temperature, the Cu—Sn compound layer or the Cu—Ni—Sn compound layer 4 is formed immediately on the Ni layer 3 by the reaction with the Ni layer 3 simultaneously with the precipitation of the Cu—Sn compound.

After the heat treatment, the surface layer turns to be a Sn layer or a Sn—Cu alloy layer 5 not containing a brightener. The proportion of Cu in the Sn—Cu alloy layer not containing a brightener is 0.7 to 0.9 mass % that is a usual Sn—Cu eutectic composition. In this case, tin oxide is relatively scarce on the surface layer and hence a metal strip showing good solder wettability at succeeding connection can be provided.

Here, since a brightener is not contained in the matte Sn—Cu alloy layer 7 that is the origin of the Sn layer or the Sn—Cu alloy layer 5 and the Cu—Sn compound layer or the Cu—Ni—Sn compound layer 4 of a manufactured metal strip 1, the Vickers hardness of the metal strip 1 is as low as 100 or less even after the heat treatment is applied in order to obtain the metal strip 1, and hence whiskers caused by external compression stress generated at the fitting with an FPC, an FFC and the like can be inhibited.

Here, the surface layer usually comes to be the Sn—Cu alloy layer (a Sn—Cu eutectic composition) that is the most stable state but, when the surface layer is very thin, for example about 2 μm or less, the surface layer may sometimes be composed of Sn. The reason is that, when the layer thickness is 2 μm or less, the state where all the Cu component is used for forming the Cu—Sn compound layer or the Cu—Ni—Sn compound layer existing at the under layer of the surface layer and the surface layer is composed of Sn is more stable than the state where the surface layer exists as a layer having a Sn—Cu eutectic composition.

Here, it is desirable to apply the heat treatment at a temperature not higher than 350° C. The reason is that, if the heat treatment is applied at a temperature not lower than 350° C., the Vickers hardness comes to be higher than 100, and when the metal strip is fitted with an FPC or an FFC and stress is loaded from outside, compression stress is generated at the joint, whiskers appear and grow, oxidation is accelerated on the surface, and solder wettability deteriorates considerably.

The proportion of Cu in the matte Sn—Cu alloy layer 7 has to be 4 mass % or less in order to set the heat treatment temperature at 350° C. or lower. If the proportion of Cu in the matte Sn—Cu alloy layer 7 is less than 1 mass %, the difference from the proportion of Cu in the Sn—Cu eutectic alloy that is in the range of 0.7 to 0.9 mass % is too small, the quantity of the Cu—Sn compound or the Cu—Ni—Sn compound reprecipitating on the Ni layer 3 is too small, a part where the Cu—Sn compound or the Cu—Ni—Sn compound is not formed appears in the Cu—Sn compound layer or Cu—Ni—Sn compound layer 4, and the reaction between the Ni layer 3 and the Sn layer or the Sn—Cu alloy layer 5 not containing a brightener cannot completely be inhibited. Consequently, the proportion of Cu in the matte Sn—Cu alloy layer 7 has to be in the range of 1 to 4 mass %. Here, in the case of a Sn-(1 to 4 mass %)Cu composition, the solidus temperature is 227° C. and the liquidus temperature is about 235° C. to 350° C.

That is, by controlling the proportion of Cu in the matte Sn—Cu alloy layer 7 on the Ni layer 3 in the range of 1 to 4 mass % and applying heat treatment at a temperature not higher than 350° C., the Vickers hardness of the metal strip 1 comes to be 100 or less and both the whiskers caused by internal stress and the whiskers caused by external stress can be inhibited simultaneously.

Here, although it is generally known that the matte plating used as above is largely inferior to bright plating in solder wettability, the solder wettability can be improved to a practically usable level by applying heat treatment at a low temperature of 350° C. or lower.

Figure 3:
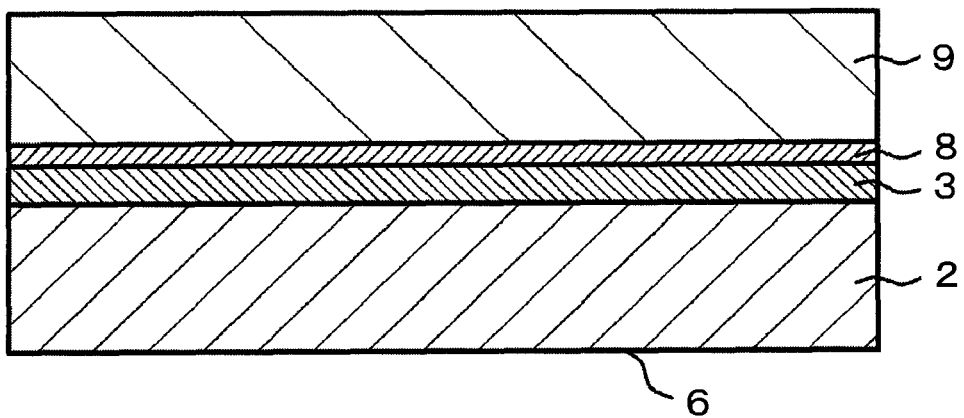
[FIG. 3] A schematic sectional view showing a second layered structure of a metal strip before heat treatment used for manufacturing a metal strip according to the present invention.

Although the laminated structure including the Ni layer 3 and the matte Sn—Cu alloy layer 7 has been explained above as a representative example of a metal strip 6 before heat treatment used for manufacturing a metal strip according to the present invention, the metal strip 6 before heat treatment is not limited to the example and it is also possible to use a metal strip formed by sequentially laminating a Ni layer 3, a Cu layer 8, and a Sn layer 9 without using a brightener on a base metal 2 as the second laminated structure as shown in FIG. 3. Here, one or more kinds of metals selected from the group of Zn, Al, Si, Mg, and Ti may be contained by 1 mass % or less in the Sn layer 9. By containing a trace of such easily-oxidizable metals, the metals are selectively oxidized during the subsequent heat treatment and reflow process, hence the oxidation of the Sn layer 7 on the outermost surface can be inhibited to the minimum, and the generation of plated film internal compression stress caused by the lid effect of the tin oxide layer on the outermost surface and the accompanying occurrence of whiskers can be inhibited.

In this case, by applying heat treatment to the metal strip at a temperature not lower than the melting point of Sn, at least not lower than the solidus line of the Sn—Cu alloy, to not higher than 350° C. after the laminated layer is formed and making the Cu layer 8 react with the Sn layer 9 completely, the Cu—Sn compound layer or the Cu—Ni—Sn compound layer is formed immediately on the Ni layer 3, the Sn layer or the Sn—Cu alloy layer is formed in the surface layer, the Vickers hardness comes to be 100 or less, and hence a metal strip 1 having the similar effects can be manufactured.

The results of concrete experiments are shown hereunder.

The Vickers hardness and the occurrence of whiskers (caused by internal stress and caused by external stress) of each of the samples of the metal strips according to the present invention (examples 1 to 9) and the samples of the conventional metal strips (comparative examples 1 to 4) are examined, and the results are shown in FIG. 4. As each of the samples, a base metal (32 mm×15 mm×thickness 0.25 mm) made of phosphor bronze is used, electrolytic degreasing treatment and acid activation treatment are applied as pre-treatment before plating, and thereafter a plated layer is formed sequentially on the surface by an ordinary electroplating method. The thickness of a plated film is measured with an X-ray fluorescence thickness meter. Thereafter, each sample is maintained in $N_2$ at a prescribed temperature for 10 seconds and heat-treated.

The Vickers hardness on the surface of a metal strip sample is measured at a creep rate of 5 gf/2 s and a creep time of 5 s. with a micro-Vickers hardness tester.

The occurrence of whiskers is examined as follows. An FPC is fitted with a connector formed by processing a metal strip sample and, after the sample is left for 1,000 hours at room temperature at 50% relative humidity, the occurrence of whiskers is observed with a metallographic microscope and a scanning electron microscope. The length of whiskers is represented by the maximum length. In each of the examples 1 to 9, the Vickers hardness is as relatively soft as 100 or less, the occurrence of whiskers caused by internal stress is not observed, and the maximum length of the whiskers caused by external stress is 20 μm or less.

The solder wettability of each of the samples of the metal strips according to the present invention (examples 1 to 9) and the samples of the conventional metal strips (comparative examples 1 to 4) is examined and the results are shown in FIG. 5.

The solder wettability is evaluated by measuring a zero cross time and a maximum wetting force with a meniscograph. As each of the test samples, a metal strip of 15 mm×3 mm×thickness 0.25 mm is used. Sn-3Ag-0.5Cu is used as the solder in a bath and the bath temperature is set at 240° C. The descending rate is set at 2.0 mm/s., the dipping depth at 2.0 mm, and the retention time at 20 s. Each specimen is coated with flux by dipping the tip of about 3 mm in 25 mass % WW Rosin/IPA flux for 5 seconds before the specimen is dipped in the solder bath.

In each of the examples 1 to 9, the zero cross time is relatively short, the maximum wetting force is relatively large, and good solder wettability is obtained.

In each of the comparative examples 1 to 4 using conventional metal strip samples, a problem arises in one of the occurrence of whiskers (caused by internal stress or caused by external stress) and the solder wettability.

In both the examples and the comparative examples, a Cu—Ni—Sn compound layer is formed immediately on the Ni layer in the case of a sample heat-treated at a temperature not lower than the liquidus temperature of the Sn—Cu alloy layer and a Cu—Sn compound layer is formed immediately on the Ni layer in the case of a sample heat-treated at a temperature lower than the liquidus temperature. Further, in the sample of example 9 having a thin Sn—Cu plating thickness of 1.5 μm, the outermost surface layer after the heat treatment is not a Sn-0.75Cu layer but a Sn layer.

From the above experimental results, it is found that a metal strip according to the present invention has both good whisker resistance (inhibition of whiskers caused by internal stress and inhibition of whiskers caused by external stress) and good solder wettability.

Figure 6:
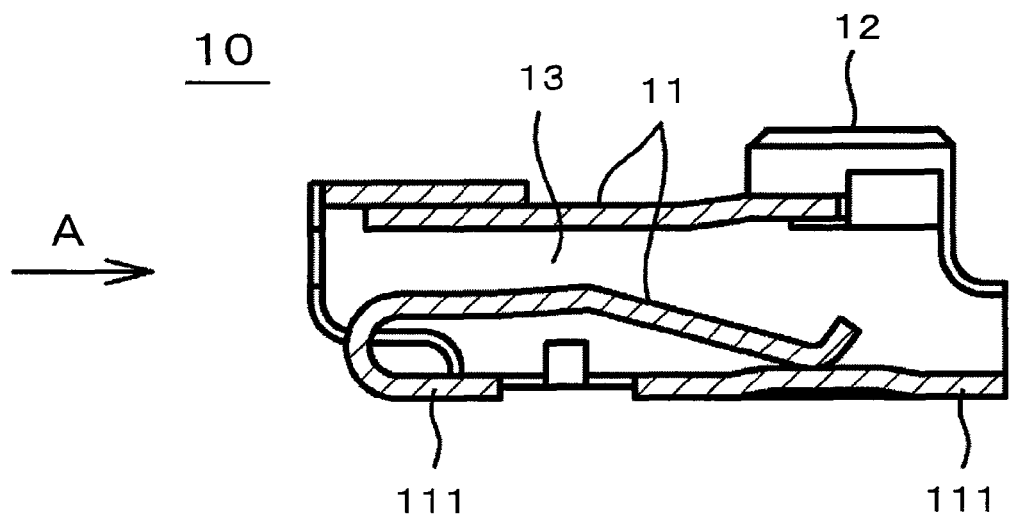
[FIG. 6] A sectional view of a connector.
Figure 7:
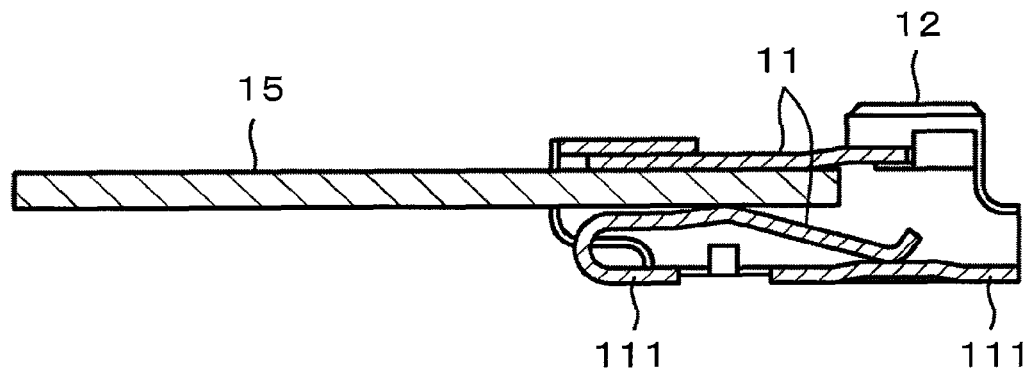
[FIG. 7] A sectional view showing the state where a male terminal is inserted into a connector.

FIG. 6 is a sectional view of a connector 10 for which a metal strip according to the present invention is used. In FIG. 6, a female terminal 11 is disposed in a resin mold 12. The portion interposed from the top and the bottom by the female terminal 11 functions as a joint 13. An FPC or an FFC is inserted into the joint 13 from the direction indicated with the arrow A as shown in FIG. 6 and conducts to the connector 10. FIG. 7 is a view showing the state where a male terminal 15 is inserted into the connector 10 of FIG. 6. The male terminal 15 may be not only an FPC or an FFC but also a male terminal 15 of another connector. In FIGS. 6 and 7, the female terminal 11 and the male terminal 15 are plurally aligned respectively at prescribed intervals in the direction perpendicular to the plane of the figures. A lower part 111 of the female terminal 11 is soldered to a substrate. By using an above-explained metal strip according to the present invention for a female terminal 11 or a male terminal 15, it is possible to obtain a connector 10 that can inhibit whiskers from forming and have excellent solder wettability between the connector 10 and a substrate.

What is claimed is:

1. A metal strip comprising:
   a base metal,
   a Ni layer formed on the base metal,
   a Cu—Sn compound layer or a Cu—Ni—Sn compound layer formed on the Ni layer, and
   a Sn layer or a Sn—Cu alloy layer formed on the Cu—Sn compound layer or the Cu—Ni—Sn compound layer;
   wherein the metal strip has a Vickers hardness of 100 or less.

2. The metal strip according to claim 1, wherein a proportion of a total Cu quantity to a total Sn+Cu quantity in the Sn layer or the Sn—Cu alloy layer and the Cu—Sn compound layer or the Cu—Ni—Sn compound layer is 1 to 4 mass %.

3. The metal strip according to claim 1, wherein the Sn layer or the Sn—Cu alloy layer is an uppermost surface layer and matted layer.

4. The metal strip according to claim 1, wherein the Ni layer does not touch the Sn layer or the Sn—Cu alloy layer by interposing in between the Cu—Sn compound layer or the Cu—Ni—Sn compound layer formed between them.

5. The metal strip according to claim 1, wherein the Cu—Sn compound layer or the Cu—Ni—Sn compound layer is formed in a manner of touching the Ni layer, and the Sn layer or the Sn—Cu alloy layer is formed in a manner of not touching the Ni layer but touching the Cu—Sn compound layer or the Cu—Ni—Sn compound layer.

6. The metal strip according to claim 1, wherein the Sn layer or the Sn—Cu alloy layer and the Cu—Sn compound layer or the Cu—Ni—Sn compound layer are formed by applying heat treatment to a Sn—Cu alloy plated layer that is laminated on the Ni layer and does not contain a brightener.

7. The metal strip according to claim 1, wherein the base metal is made of Cu alloy.

8. The metal strip according to claim 7, wherein the base metal is made of phosphor bronze.

9. A connector having a terminal formed with a metal strip in a resin mold, wherein the metal strip: includes a base metal, a Ni layer formed on the base metal, a Cu—Sn compound layer or a Cu—Ni—Sn compound layer formed on the Ni layer, and a Sn layer or a Sn-Cu alloy layer formed on the Cu—Sn compound layer or the Cu—Ni—Sn compound layer, and has a Vickers hardness of 100 or less.

10. The connector according to claim 9, wherein a proportion of a total Cu quantity to a total Sn+Cu quantity in the Sn layer or the Sn—Cu alloy layer and the Cu—Sn compound layer or the Cu—Ni—Sn compound layer is 1 to 4 mass %.

11. A method of manufacturing a metal strip, comprising the steps of:
laminating a Ni layer and a Sn-(1 to 4 mass %)Cu alloy layer sequentially on a base metal; and
heat-treating the laminated base metal at a temperature not lower than the solidus temperature of the Sn-(1 to 4 mass %)Cu alloy and forming a Cu—Sn compound layer or a Cu—Ni—Sn compound layer on the Ni layer, and a Sn layer or a Sn—Cu alloy layer on the Cu—Sn compound layer or the Cu—Ni—Sn compound layer.

12. The method of manufacturing a metal strip according to claim 11, wherein the Sn-(1 to 4 mass %)Cu alloy layer is formed by matt plating.

13. The method of manufacturing a metal strip according to claim 11, wherein the Sn-(1 to 4 mass %)Cu alloy layer contains one or more kinds of metals selected from the group of Zn, Al, Si, Mg, and Ti by 0.01 to 1 mass %.

* * * * *